(12) United States Patent
Frank

(10) Patent No.: US 7,930,519 B2
(45) Date of Patent: Apr. 19, 2011

(54) PROCESSOR WITH COPROCESSOR INTERFACING FUNCTIONAL UNIT FOR FORWARDING RESULT FROM COPROCESSOR TO RETIREMENT UNIT

(75) Inventor: Michael Frank, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 48 days.

(21) Appl. No.: 12/337,159

(22) Filed: Dec. 17, 2008

(65) Prior Publication Data

US 2010/0153686 A1 Jun. 17, 2010

(51) Int. Cl.
*G06F 15/16* (2006.01)
(52) U.S. Cl. ............................................. 712/34; 712/29
(58) Field of Classification Search .................. None
See application file for complete search history.

(56) References Cited

U.S. PATENT DOCUMENTS

| | | | |
|---|---|---|---|
| 5,764,939 A | 6/1998 | Caulk | |
| 5,909,565 A * | 6/1999 | Morikawa et al. | 712/200 |
| 5,923,893 A | 7/1999 | Moyer et al. | |
| 6,338,108 B1 * | 1/2002 | Motomura | 710/110 |
| 6,557,065 B1 | 4/2003 | Peleg et al. | |
| 6,684,305 B1 * | 1/2004 | Deneau | 711/159 |
| 6,754,804 B1 | 6/2004 | Hudepohl et al. | |
| 7,079,147 B2 * | 7/2006 | Wichman et al. | 345/503 |
| 7,237,090 B1 | 6/2007 | Hudepohl et al. | |
| 7,421,694 B2 * | 9/2008 | Gosalia et al. | 718/104 |
| 2002/0010848 A1 | 1/2002 | Kamano et al. | |
| 2003/0225816 A1 * | 12/2003 | Morrow et al. | 709/107 |
| 2004/0142717 A1 | 7/2004 | Schmidt | |
| 2007/0225034 A1 | 9/2007 | Schmidt | |
| 2008/0059771 A1 | 3/2008 | Svendsen et al. | |
| 2009/0055596 A1 * | 2/2009 | Wallach et al. | 711/141 |

OTHER PUBLICATIONS

Advanced Micro Devices "Am9513 System Timing Controller" Copyright 1980 by Advanced Micro Devices, Inc., 26 pages.
Advanced Micro Devices Inc., "Am9511A Arithmetic Processor" Publication # 09244, issue date Dec. 1987, 10 pages.
Advanced Micro Devices Inc., "Am9511 Arithmetic Processing Unit", 1978, 12 pages.
Wikipedia, "Hyper Transport," http://en.wikipedia.org/w/index.php?title=HyperTransport&oldid=255465882, XP002574176, pp. 1-5, Dec. 2, 2008.
PCT Invitation to Pay Additional Fees and Annex to Form PCT/ISA/206 Communication Relating to the Results of the Partial International Search, 9 pages, Apr. 20, 2010.

\* cited by examiner

*Primary Examiner* — Kenneth S Kim
(74) *Attorney, Agent, or Firm* — Meyertons, Hood, Kivlin, Kowert & Goetzel, P.C.; Dean M. Munyon

(57) ABSTRACT

A processor unit and a coprocessor unit are disclosed. In one embodiment, the processor unit includes a functional unit that receives a set of instructions in an instruction stream and provides the set of instructions to the coprocessor unit. The coprocessor executes the instructions and initiates transmission of a set of execution results corresponding to the set of instructions to the processor unit's functional unit. The processor functional unit may be coupled to the coprocessor unit through a shared bus circuit implementing a packet-based protocol. The processor unit and the coprocessor unit may share a coherent view of system memory. In various embodiments, the functional unit may alter entries in a translation lookaside buffer (TLB) located in the coprocessor unit, resume and suspend a thread executing on the coprocessor unit, etc.

20 Claims, 12 Drawing Sheets

PROCESSOR WITH COPROCESSOR INTERFACING FUNCTIONAL UNIT FOR FORWARDING RESULT FROM COPROCESSOR TO RETIREMENT UNIT

BACKGROUND

This invention relates generally to computer processing and more specifically, to executing instructions on a processor unit and coprocessor unit that share an instruction stream.

SUMMARY

Various techniques for executing instructions on a coprocessor unit are disclosed.

In one embodiment, an apparatus including a first processor functional unit that is coupled to a coprocessor unit is disclosed. In one embodiment, the first processor functional unit is configured to receive, from a scheduler unit, a first set of instructions in a first instruction stream and provide the first set of instructions to the coprocessor unit. Then, the first processor function unit is configured to receive, from the coprocessor unit a first set of execution results corresponding to the first set of instructions, where the coprocessor unit initiates the transmission of the first set of execution results. In certain embodiments, the apparatus includes a bus circuit that couples the first processor functional unit to the coprocessor unit and that is implements a packet-based protocol. In some embodiments, the packet-based protocol is a hypertransport protocol or a PCI-Express protocol. In other embodiments, the first processor functional unit is configured to alter entries in a translation lookaside buffer (TLB) located in the coprocessor unit. In another embodiment, a coprocessor unit including a processor interface unit and a processing core is disclosed. The processor interface unit is configured to receive instructions from a coprocessor interface unit in a companion processor unit, where the instructions are from an instruction stream shared by the companion processor unit. The processing core is configured to execute the received instructions to generate a first set of execution results and to initiate the conveyance of the first set of execution results to the companion processor unit via the processor interface unit. In certain embodiments, the processing core includes a TLB and is configured to transmit an indication of a page fault to an operating system that is executing on the companion processor via the processor interface and receive an indication that the operating system has serviced the page fault via the processor interface. In various embodiments, the processing core is configured to perform a page table walk. In some embodiments, the coprocessor unit shares a coherent view of memory with the companion processor unit.

In another embodiment, a tangible computer-readable memory medium is disclosed that stores program instructions executable by a computer system that includes a coprocessor unit and a companion processor unit. The stored program instructions include a first set of program instructions, each having one of a first set of opcodes, where the first set of program instructions are executable by one or more functional units within the companion processor unit. The stored program instructions also includes a second set of program instructions, each having one of a second set of opcodes, where the second set of program instructions are executable within the coprocessor unit. The companion processor unit, in response to receiving program instructions within the second set of program instructions, is configured to provide those instructions to a coprocessor interface unit of the companion processor unit that is coupled to the coprocessor unit. The coprocessor interface unit is configured to convey program instructions within the second set of instructions to the coprocessor unit for execution, and subsequently receive coprocessor unit-initiated transmissions of execution results of the conveyed instructions.

BRIEF DESCRIPTION OF THE DRAWINGS

The following detailed description makes reference to the accompanying drawings, which are now briefly described.

DETAILED DESCRIPTION

Figure 1:
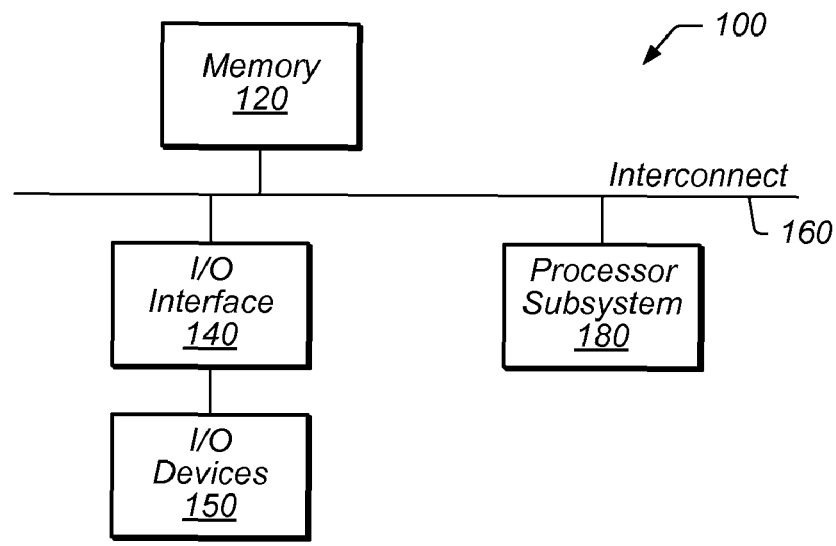
FIG. 1 is a block diagram of one embodiment of a computer system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a first processor functional unit . . . ." Such a claim does not foreclose the apparatus from including additional components (e.g., a second processor functional unit, a cache, etc.).

"Computer System." This term has its ordinary and accepted meaning in the art, and includes one or more computing devices operating together, each including one or more processor units and memory.

"Configured." As used herein, this term means that a particular piece of hardware of software is arranged to perform a particular task or tasks when operated. Thus, a computer system that is "configured to" perform task A means that the computer system includes a circuit, program instructions stored in memory, or other structure that, during operation of the computer system, performs or can be used to perform task A. Similarly, a computer program that is "configured to" perform task B includes instructions, that if executed by a computer system, perform task B.

"Software." This term has its ordinary and accepted meaning in the art, which includes computer programs of any form; programs include sets of instructions that direct the operation of a computer system.

"Software Application." This term refers broadly to an instance of software. A computer backup program is a type of software application. The term "software application" also includes operating systems in addition to programs that run on operating systems.

"Processor unit." This term has its ordinary and accepted meaning in the art, which at least includes any circuitry that is configured to execute program instructions (e.g., a central processing unit (CPU)). As used herein, a processor unit may refer to a "main" processor unit or a coprocessor unit. A main processor unit that operates in conjunction with a coprocessor unit may be referred to as a "host" or "companion" processor unit. A processor unit may have one or more processing "cores" on a single die. Additionally, a processor unit may be distributed across multiples dies.

"Processing core." This term has its ordinary and accepted meaning in the art, which includes one of a plurality of processing circuits (e.g., a CPU) within a processor unit. For example, a processor core may refer to one core of a multi-core (chip-level multi-processor) device.

"Coprocessor unit." This term refers broadly to any processor unit that is used to supplement the functions of a companion processor. A coprocessor unit that shares an instruction stream with a companion processor differs from an accelerator unit that receives an instruction stream that is separate from that of the companion processor.

"Instruction." This term has its ordinary and accepted meaning in the art, which at least includes a set of bits that directs a processor unit or core to perform some set of operations. Instructions may include, in various embodiments, operation identifiers (e.g., opcodes), immediate data (e.g., operands), addresses, etc.

"Instruction stream." This term may describe a sequence of consecutive-in-time instructions (e.g., from a software application) that are provided to a processor unit or core. An instruction stream can include instruction which are consecutive in an address space, as well as instructions that are executed out-of-order relative to some original ordering.

"Execution results." This term refers broadly to any changes in state that occur as a result of a processor unit or core executing instructions. For example, execution results may include a resultant value (e.g., sum of an addition), status/completion notifications, an indication of exceptions (e.g., a flag indicating a page fault), a command (e.g., telling a processing unit to suspend an executing thread), etc.

"Scheduler unit." This term refers broadly to circuitry within a processor unit or core that prepares an instruction for execution (e.g., circuitry that fetches, decodes, and/or schedules instructions for execution in a processor unit or core, or circuitry that directs instructions to appropriate functional units within the processor unit or core).

"Functional unit." This term has its ordinary and accepted meaning in the art, which refers broadly to any circuitry within a processor unit or core that executes instructions or causes instructions to be executed on its behalf. A processor unit or core may contain multiple functional units that are each dedicated to performing specific functions (e.g., fixed-point arithmetic instructions, floating-point arithmetic instructions, load/store instructions, etc.). A "functional unit" includes circuitry that, for example, receives a coprocessor-initiated transmission of execution results, and retires the instructions.

"Shared bus circuit." This term refers to any bus circuit that is shared by three or more devices. A shared bus circuit thus differs from a "point-to-point" bus, which is between two devices.

"Memory access device." This term refers broadly to circuitry (typically a discrete chip) that enables one or more processing units to access memory.

"Thread." As used herein, this term refers to a part of a program that can be run independently of other aspects of the program.

"Multithreaded." This term refers to a processor unit's or core's ability to support the simultaneous execution of multiple threads.

"Corresponding thread." This term refers broadly to related threads executing on different processor units or cores. For example, if a thread executing on a processor invokes a thread that begins execution on another processor, each of these threads may be described as "corresponding to" the other. Threads that are communicating with one another while executing on different processor units or cores may also be described as "corresponding threads."

"Resume." This term refers to the act of re-starting the execution of a thread on a multithreaded processor unit or core.

"Suspend." This term refers to the act of stopping the execution of a thread on a multithreaded processor unit or core.

"Translation Lookaside Buffer (TLB)." This term has its ordinary and accepted meaning in the art, which includes a cache that stores translations of virtual addresses to physical addresses.

"Page table walk." This term has its ordinary and accepted meaning in the art, and includes the process of looking up a translation of a virtual address to a physical address in memory after failing to locate the translation within a TLB.

Turning now to FIG. 1, one embodiment of a computer system 100 is depicted. The present disclosure describes various embodiments of a processor unit and a coprocessor unit that are included within a computer system. The disclosed computer systems may be any suitable type of computing device. As shown, computer system 100 includes a processor subsystem 180 that is coupled to a memory 120 and I/O interfaces(s) 140 via an interconnect 160 (e.g., a system bus). I/O interface(s) 140 is coupled to one or more I/O devices 150. Computer system 100 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 100 may also be any type of networked peripheral device such as storage devices, switches, modems, routers, etc. Although a single computer system 100 is shown in FIG. 1 for convenience, system 100 may also be implemented as two or more computer systems operating together.

Processor subsystem 180 may include one or more processors or processing units. For example, processor subsystem 180 may include one or more processor units that are coupled to one or more coprocessor units. In various embodiments of computer system 100, multiple instances of processor subsystem 180 may be coupled to interconnect 160. In various embodiments, processor subsystem 180 (or each processor unit within 180) may contain a cache or other form of onboard memory. Processors subsystem 180 is described in greater detail below in conjunction with FIG. 2 below.

Memory 120 is usable by processor subsystem 180. Memory 120 may be implemented using different physical memory media, such as hard disk storage, floppy disk storage, removable disk storage, flash memory, random access memory (RAM-SRAM, EDO RAM, SDRAM, DDR SDRAM, Rambus® RAM, etc.), ROM (PROM, EEPROM, etc.), and so on. Memory in computer system 100 is not limited to memory 120. Rather, computer system 100 may be said to have a "memory subsystem" that includes various types/locations of memory. For example, the memory subsystem of computer system 100 may, in one embodiment, include memory 120, cache memory in processor subsystem 180, and storage on I/O Devices 150 (e.g., a hard drive, storage array, etc.). Thus, the phrase "memory subsystem" is representative of various types of possible memory media within computer system 100. In some embodiments, the memory subsystem stores program instructions executable by processor subsystem 180.

I/O interfaces 140 may be any of various types of interfaces configured to couple to and communicate with other devices, according to various embodiments. In one embodiment, I/O interface 140 is a bridge chip from a front-side to one or more back-side buses. I/O interfaces 140 may be coupled to one or more I/O devices 150 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 100 is coupled to a network via a network interface device.

Figure 2:
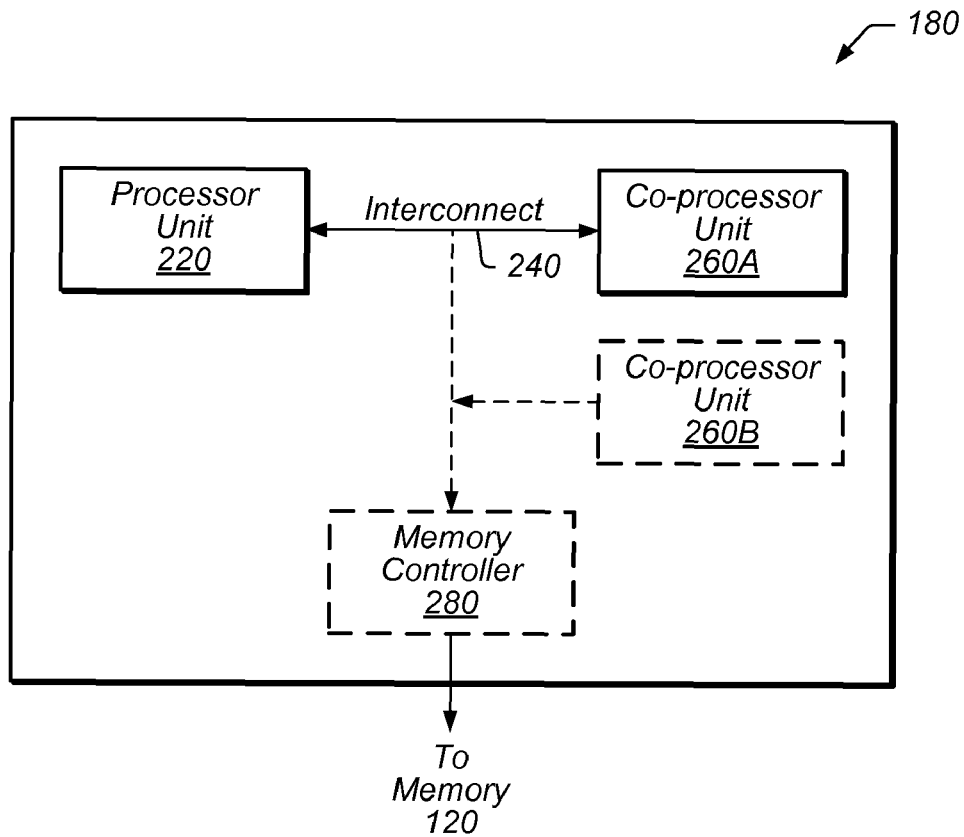
FIG. 2 is a block diagram of one embodiment of processor subsystem including a processor unit and one or more coprocessor units.

Turning now to FIG. 2, one embodiment of processor subsystem 180 is illustrated. As shown, processor subsystem 180 includes a processor unit 220, coprocessor units 260A and 260B, and a memory controller 280, all coupled together via an interconnect 240 (e.g., a point-to-point or shared bus circuit). In one embodiment, processor unit 220 and coprocessor units 260 may be located on the same die. In another embodiment, processor unit 220 and coprocessor units 260 may be located on separate dies. Coprocessor unit 260B and memory controller 280 are illustrated with a dotted line to indicate that all embodiments of processing subsystem 180 need not include these blocks. (This is not to say that other components of subsystem 180 are mandatory.) For example, processor unit 220 may be coupled only to a single coprocessor unit (e.g., 260A); alternately, unit 220 may be coupled to multiple coprocessor units (e.g., 260A and 260B). Additional coprocessor units are possible in other embodiments. In various embodiments, processor unit 220 and coprocessor units 260 may share a common memory controller 280. Memory controller 280 may be configured, for example, to access a main system memory (e.g., memory 120). In other embodiments, each processor unit 220 and coprocessor units 260 may be coupled to respective memory controllers.

In one embodiment, processor unit 220 is a general-purpose processor unit (e.g., a central processing unit (CPU)) that may include one or more execution units. Alternately, unit 220 may be a special-purpose processor such as a graphics processor. In one embodiment, processor unit 220 is configured to execute instructions fetched from memory 120 using memory controller 280. The architecture of unit 220 may have various features—for example, it may be pipelined. In other embodiments, processor unit 220 may implement a multithreaded architecture for simultaneously executing multiple threads. Processor unit 220 may execute, without limitation, application-specific instructions as well as operating system instructions. These instructions may allow the implementation of any number of features, including, as just one example, virtual memory.

As shown in FIG. 2, processor unit 220 maybe coupled as a companion processor to one or more coprocessor units 260, permitting unit 220 to provide instructions to coprocessor units 260. Instructions provided by companion processor unit 220 to coprocessor unit 260 may be within a common instruction stream (i.e., unit 220 fetches instructions to execute and provides certain of those fetched instructions to unit 260 for execution). Certain instructions provided from processor unit 220 to coprocessor unit(s) 260 may be "control" instructions generated by a functional unit within processor unit 220 to control the operation of coprocessor unit(s) 260. Processor unit 220 is described in greater detail in conjunction with FIG. 3 below.

Coprocessor units 260A and 260B may be used to help perform the work of processor unit 220. As with processor unit 220, coprocessor units 260 are not limited to any particular function or architecture. In various embodiments, coprocessor units 260A and 260B may be general-purpose or special-purpose processors (e.g., graphics processor units (GPU), video decoding processors, encryption processors, queue managers, etc.). In one embodiment, coprocessor units 260 may be implemented as a field-programmable gate array (FPGA). In some embodiments, coprocessor units 260 may be pipelined. Coprocessor units 260 may, in some embodiments, employ a multithreaded architecture. In various embodiments, coprocessor units 260 may be configured to execute microcode instructions in order to perform certain instructions received from unit 220. In certain embodiments, coprocessor units 260 may support the use of virtual memory. Coprocessors units 260 are described in greater detail below in conjunction with FIG. 4 below.

Interconnect 240, in one embodiment, is a shared bus circuit that couples processor unit 220 to coprocessor units 260. In one embodiment, interconnect 240 may implement a "virtual tunnel" that allows processor unit 220 to communicate with coprocessor units 260 via a packet-based protocol such as Hyper Transport or PCI-Express. In some embodiments, interconnect 240 may be a front-side bus. In one embodiment, coprocessor units 260 may be coupled to processor unit 220 through a Northbridge-type device.

In one embodiment, memory controller 280 is configured to provide an interface for processor unit 220 and/or coprocessor units 260 to access memory (e.g., memory 120). Memory controller 280 may be used, for example, to fetch instructions or to load and store data. In one embodiment, processor unit 220 may use memory controller 280 to fetch instructions for execution in processor unit 220 or coprocessor units 260. In another embodiment, a coprocessor unit 260 may use memory controller 280 to fetch its own instructions or data.

In certain embodiments, processor unit 220 and coprocessor unit 260 are configured to achieve coherence for a shared memory (e.g., memory 120) in which processor unit 220 and/or coprocessor unit 260 alter (e.g., invalidate or update) cached entries stored in their respective processors. In one embodiment, processor unit 220 and coprocessor unit 260 implement a "snooping" protocol in which each processor monitors the memory bus (e.g., interconnect 160) to determine whether to invalidate/update cached entries. In an alternative embodiment, processor unit 220 and coprocessor unit 260 indicate to one another when cached entries are to be invalidated or updated. In some embodiments, processor unit 220 and coprocessor 260 are configured to share a coherent view of virtual memory. For example, processor unit 220 and coprocessor unit 260 may maintain separate TLBs for a common page table that is generated by an operating system executing on one of the processors (e.g., processor unit 220).

Figure 3:
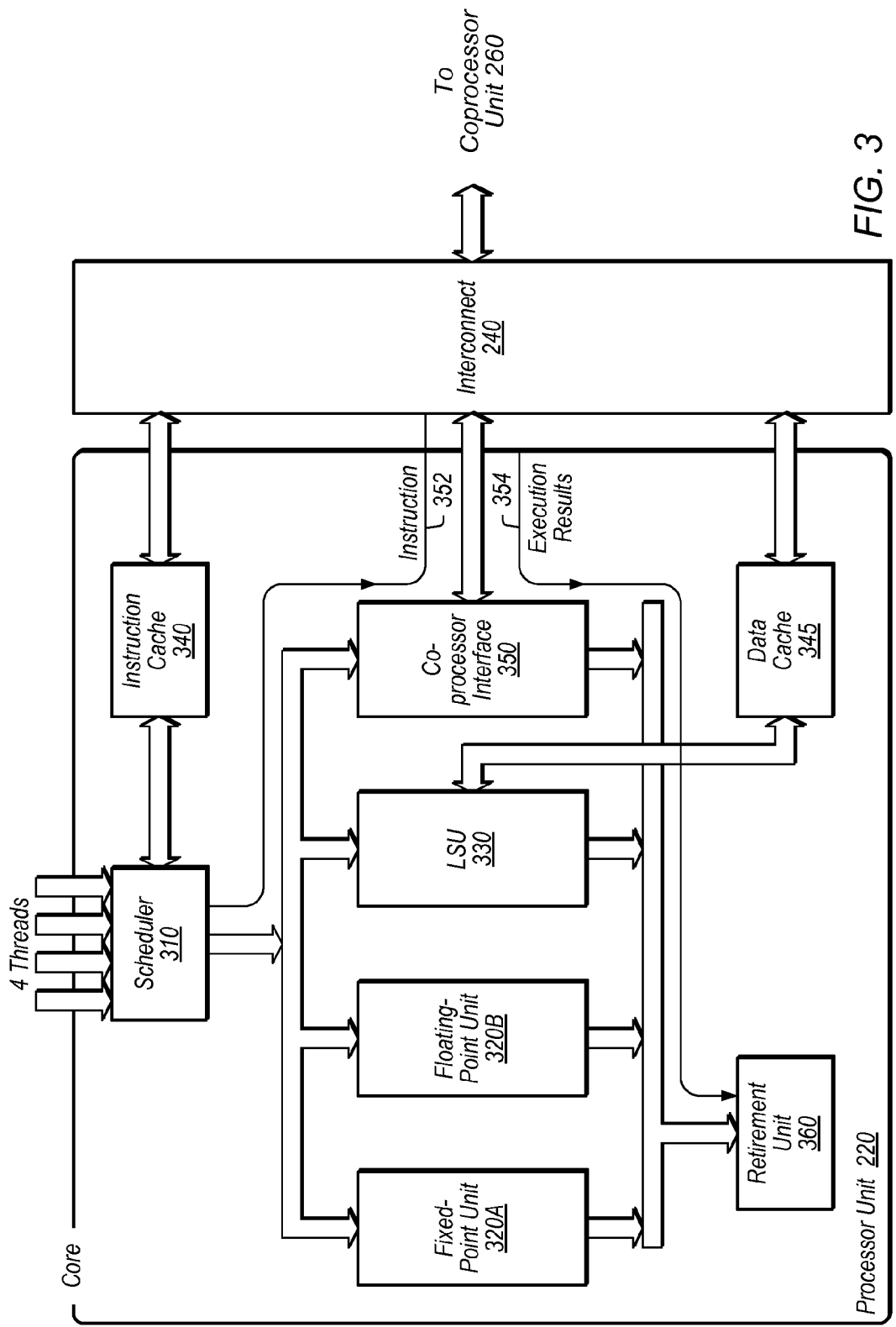
FIG. 3 is a block diagram of one embodiment of processor unit including a coprocessor interface unit.

Turning now to FIG. 3, a processor unit 220 is illustrated. Processor unit 220 is one embodiment of a companion processor unit that may be coupled to one or more coprocessor units 260. As shown, processor unit 220 includes a scheduler unit 310, fixed-point and floating-point units 320A and 320B, load store unit (LSU) 330, coprocessor interface unit 350, and retirement unit 360. In the embodiment shown, scheduler unit 310 is coupled to instruction cache 340 within processor unit 220, although other embodiments may not include cache 340. Similarly, LSU 330 may be coupled to a data cache 345 as shown in FIG. 3. Other embodiments of unit 220 may not include cache 345. In various embodiments, processor unit 220 includes one or more functional units. Note that functional units 320, 330, and 350 shown in FIG. 3 are exemplary, and may not be included in processor unit 220 in various embodiments. In various embodiments, processor unit 220 may include a single functional unit 320 or a plurality of functional units 320 (as shown). In some embodiments, processor unit 220 may include a plurality of coprocessor interface units 350, where each coprocessor interface unit 350 is coupled to one or more coprocessor units 260. In one embodiment, coprocessor interface unit 350 may be located external to processor unit 220.

Processor unit 220 may be a multithreaded processor unit configured to execute a plurality of threads (e.g., 4 threads). The instructions of various threads are dispatched through scheduler unit 310 to units 320, 330, or 350 for execution. As will be described below, coprocessor interface unit 350 is configured to provide instructions it receives to a coprocessor unit 260 for execution, subsequently receiving a coprocessor-initiated transmission of execution results. When available, units 320, 330, and 350 provide execution results to retirement unit 360.

Scheduler unit 310 may contain logic to fetch and decode instructions to prepare them for execution in subsequent blocks. In one embodiment, scheduler unit 310 may include logic to fetch instructions from instruction cache 340. Scheduler unit 310 may also implement logic to handle instruction cache misses and translation of virtual instruction fetch addresses to physical addresses (e.g., scheduler unit 310 may include an Instruction Translation Lookaside Buffer (ITLB) or hardware to perform a page table walk). In some embodiments, scheduler unit 310 may route the decoded instructions to units 320, 330, and 350 based on information in the instructions. For example, scheduler unit 310 may route an instruction to coprocessor interface 350 based on an operations code (opcode) within the instruction. In various embodiments, scheduler unit 310 may implement a variety of scheduling techniques. For example, in one embodiment, scheduler unit 310 may queue instructions and schedule them using an out-of-order execution (OoOE) algorithm. Additionally, in some embodiments, scheduler unit 310 may include logic to predict branch outcomes and/or fetch target addresses.

Fixed and floating point units 320A and 320B are merely representative of functional units that may be present within one embodiment of processor unit 220. These units may contain logic to execute and generate results for various types of instructions. For example, the various instructions may perform arithmetic, logical, or shift operations. In various embodiments, units 320 may include one or more arithmetic logic units (ALUs) for performing such operations.

Load store unit 330 contains logic for executing load and store instructions. In one embodiment, load store unit 330 may include logic to handle loading and storing data to a data cache 345. In certain embodiments, load store unit 330 may implement logic to handle data cache misses and translation of virtual addresses to physical addresses (e.g., load store unit 330 may include a Data Translation Lookaside Buffer (DTLB) or hardware to perform page table walks).

Coprocessor interface unit 350 is a functional unit that provides instructions 352 to one or more coprocessor units 260 and receives corresponding execution results 354. In various embodiments, instructions 352 may include instructions received by unit 350 (e.g., from unit 310), as well as commands/instructions generated by unit 350. For example, coprocessor interface unit 350 may receive a set of instructions 352 associated with an instruction stream from scheduler unit 310 and provide the set of instructions 352 to a coprocessor unit 260 where a set of execution results 354 are generated. In this instance, coprocessor unit 260 is performing instructions from the instruction stream of processor unit 220. Additionally, coprocessor interface unit 350 may provide instructions or commands 352 to coprocessor unit 260 that are not part of the instruction stream of processor unit 220. Such instructions/commands may be used to control the operation and/or synchronization of coprocessor unit 260 relative to processor unit 220, as well as for any other suitable purpose. In any event, once coprocessor unit 260 has generated a set of execution results 354, coprocessor interface unit 350 receives a set of execution results 354. In one embodiment, unit 350 provides execution results 354 to retirement unit 360. Coprocessor interface unit 350 is described in greater detail in conjunction with FIG. 5 below.

In one embodiment, retirement unit 360 contains logic for retiring execution results received from units 320, 330, and 350. In some embodiments, retirement unit 360 may be coupled to (or physically contain) one or more register banks for storing state information, in which retirement unit 360 may update the state information in the registers as execution results are received. In one embodiment, this state information may include data identifying an executing thread (e.g., a thread ID) or the corresponding process of the executing thread (e.g., a process ID). In another embodiment, the state information may include state information of threads that are executing on one or more coprocessor units 260. In various embodiments, retirement unit 360 may contain logic to queue a set of instructions as they are received after out-of-order execution (OoOE) and to reorder the set during retirement. In another embodiment, retirement unit 360 may contain trap logic for handling exceptions thrown during the execution of various instructions (e.g., a page fault exception).

Figure 4:
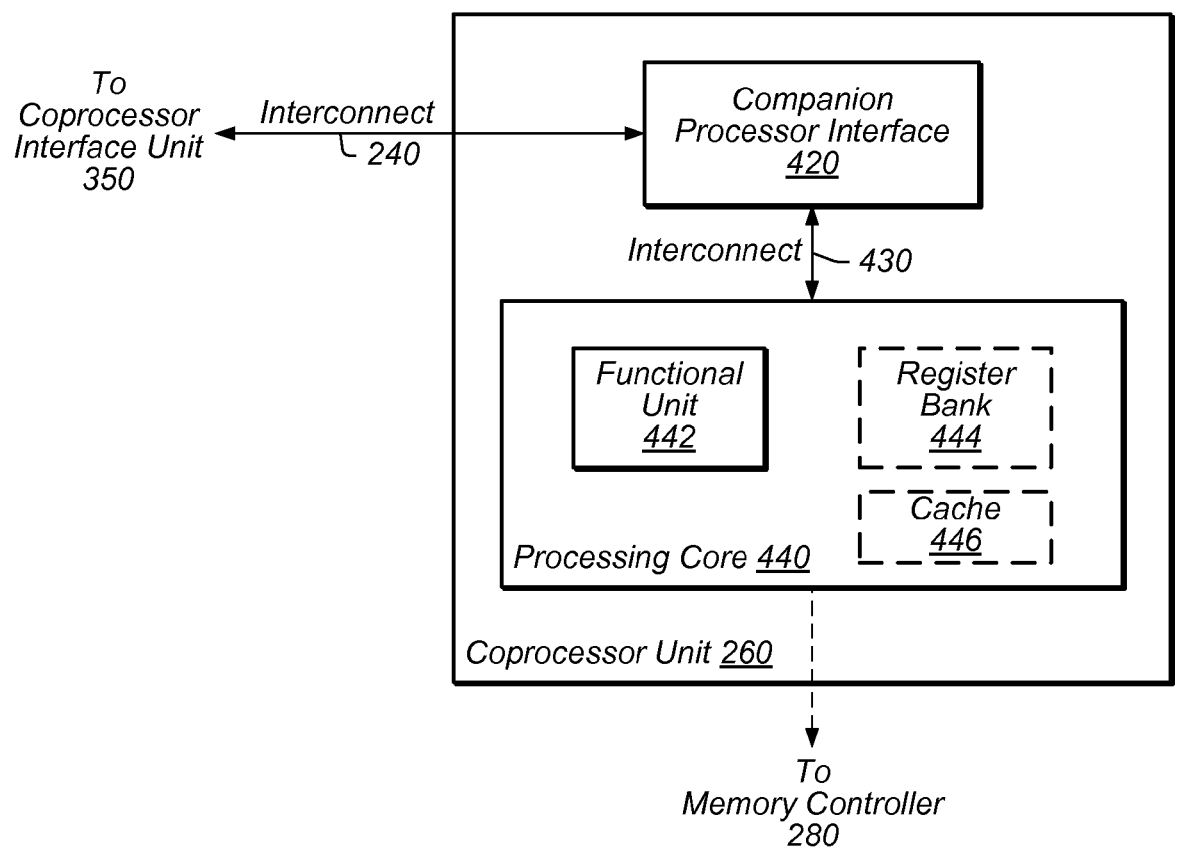
FIG. 4 is a block diagram of one embodiment of a coprocessor unit.

Turning now to FIG. 4, a coprocessor unit 260 is shown. Coprocessor unit 260 is one embodiment of a coprocessor unit that may be coupled to processor unit 220 via interconnect 240. In one embodiment, interconnect 240 may be a separate bus controlling peripheral devices or processing circuits performing specialized functions. As shown, coprocessor unit 260 includes a companion processor interface 420 and processing core 440 coupled together via interconnect 430. In one embodiment, processing core 440 may include a functional unit 442 and register bank 444. In another embodiment, processing core 440 may be coupled to a memory controller 280 and include cache 446. Companion processor interface 420 is configured to receive instructions 352 and transmit execution results 354 to coprocessor interface unit 350 of processor unit 220. Register bank 444, cache 446 and the connection to memory controller 280 are shown with a dotted line to indicate that coprocessor unit 260 may be implemented in variety of manners (e.g., in some embodiments different blocks may be included or excluded, as desired). It is noted that while coprocessor unit 260 is shown including a single processing core 440 and a single functional unit 442, coprocessor unit 260, in various embodiments, may include a plurality of processing cores 440 and/or a plurality of functional units 442. In other embodiments, coprocessor unit 260 may be attached to additional coprocessor units.

Companion processor interface 420 is an interface between coprocessor unit 260 and coprocessor interface unit 350 of processor unit 220. In one embodiment, companion processor interface 420 may be configured to store received instructions 352 in an instruction queue prior to execution and forward them to processing core 440 where the instructions are subsequently executed. In another embodiment, companion processor interface 420 may be configured to store execution results 354 in another queue after generation by processing core 440, and may transmit the execution results 354 to coprocessor interface unit 350. In one embodiment, companion processor interface 420 may transmit execution results 354 to coprocessor interface 350 in response to processor unit 220 transmitting a request for execution results 354 via coprocessor interface unit 350. In alternative embodiment, companion processor interface 420 may initiate transmission of execution results 354 upon the execution results being available—that is, without receiving explicit instructions to do so from processor unit 220.

Processing core 440 is configured to execute instructions 352 to generate execution results 354 using one or more functional units 442. Instructions 352 may be of varying complexity and have different execution requirements. In one embodiment, processing core 440 may execute instructions 352 that require no memory or register access (e.g., instructions that contain only immediate data). In other embodiments, processing core 440 may access a register bank 444 when executing instructions 352. In some embodiments, processing core 440 may execute instructions that access an onboard cache or memory 120 using memory controller memory controller 280 (e.g., instructions including address information such as load/store instructions). In some embodiments, processing core 440 may translate a virtual address to a physical address when accessing memory 120.

Processing core 440 may execute instructions from a variety of sources. In one embodiment, processing core 440 may only execute instructions 352 provided by processor unit 220. In another embodiment, processing core 440 may fetch additional instructions after receiving an initial set of instructions 352 from processor unit 220. In various embodiments, processing core 440 may generate microcode instructions from instructions 352 prior to execution.

As mentioned above, instructions 352 may, in one embodiment, include a set of instructions that are part of an instruction stream of the processor unit 220. Instructions supplied to coprocessor unit 260 may, for example, include a coprocessor opcode to designate that they are executable within unit 260 (e.g., on specific functional units 442). In another embodiment, instructions 352 may be instructions/commands generated by unit 350 that control the execution of coprocessor unit 260 (i.e., instructions not associated with the instruction stream of processor unit 220). For example, in one embodiment, such commands may be executable to control the communication of the processor unit 220 and the coprocessor unit 260 (e.g., adjust aspects of companion processor interface 420). In another example, these commands may instruct processor core 440 to perform various operations such as altering (i.e., updating or invalidating) stored data (e.g., in register bank 444 or cache 446), managing memory accessing (e.g., updating or invalidating translations in a TLB), saving state information of an executing thread (e.g., an extended save command (EXSAVE)), etc.

Execution results 354 may include any of variety of information generated as a result of executing instructions 352. In one embodiment, execution results 354 may include generated resultant values (e.g., a set of encryption instructions may generate a set of encrypted data). In another embodiment, execution results 354 may include status/completion notification information (e.g., indicating the completion of a particular thread that is executing on processing core 440). In other embodiment, execution results 354 may include exception or fault information (e.g., a page fault indication). In some embodiments, execution results 354 may include commands for controlling the operations of coprocessor interface unit 350 (e.g., commands that control the communication of processor unit 220 and coprocessor unit 260).

Various embodiments of coprocessor unit 260 are described in greater detail below in conjunction with FIGS. 6A-6D.

Figure 5:
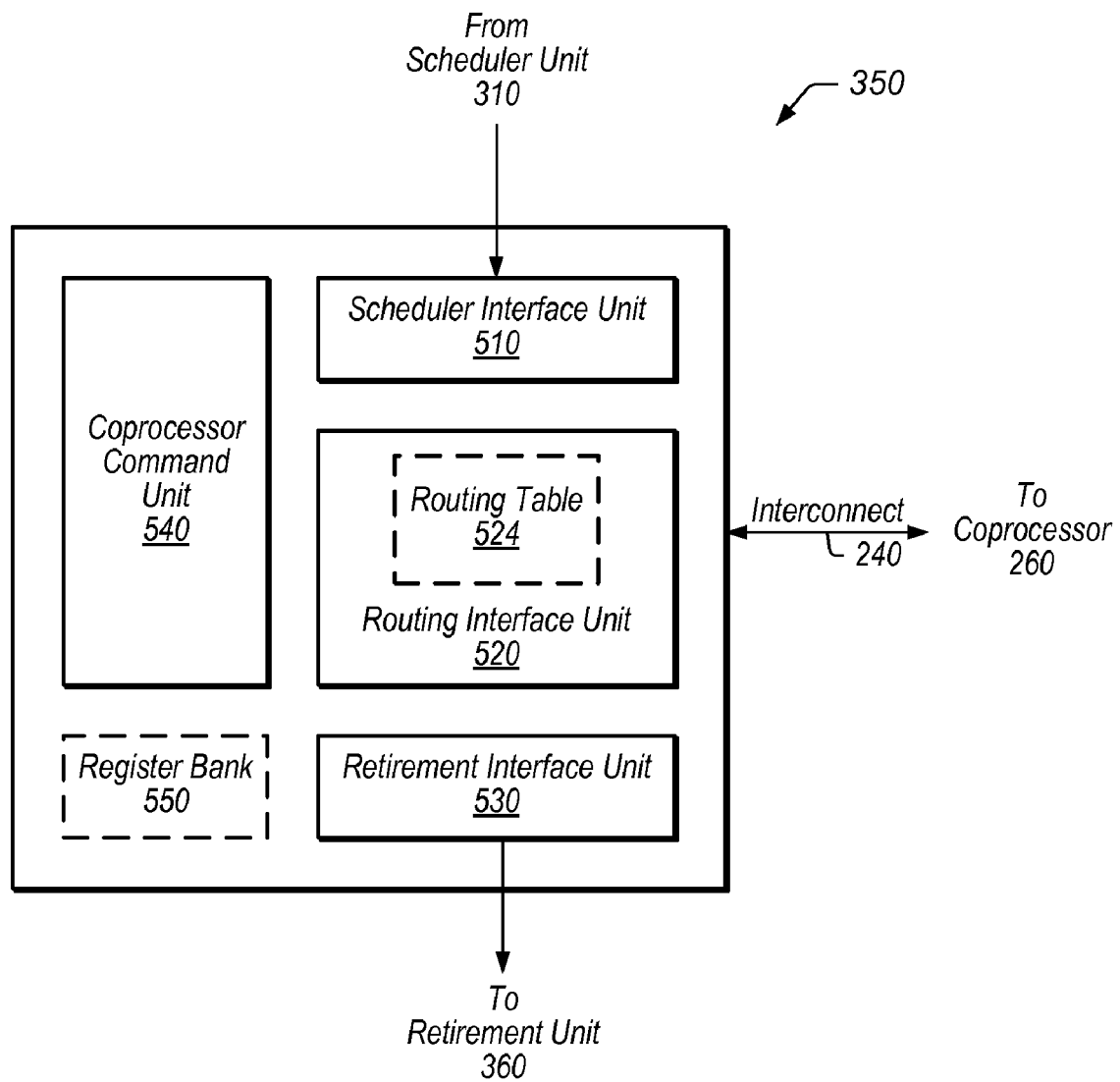
FIG. 5 is a block diagram of one embodiment of a coprocessor interface.

Turning now to FIG. 5, a coprocessor interface unit 350 is shown. Coprocessor interface unit 350 is one embodiment of a coprocessor interface unit for coupling processor unit 220 to coprocessor unit 260. As shown, coprocessor interface unit 350 includes a scheduler interface unit 510, routing interface unit 520, retirement interface unit 530, coprocessor command unit 540, and a register bank 550. Routing interface unit 520, in the depicted embodiment, includes a routing table 524. In various embodiments of unit 350, register bank 550 and/or routing table 524 may (or may not) be included as indicated by their respective dotted lines.

As noted above, coprocessor interface unit 350 is configured to provide instructions from an instruction stream of processor unit 220 to coprocessor unit 260. In one embodiment, coprocessor interface unit 350 receives instructions via a scheduler interface unit 510 and transmits the instructions 352 to coprocessor unit 260 via routing interface unit 520. Once coprocessor unit 260 has executed the instructions, routing interface unit 520 receives execution results 354, and coprocessor interface unit 350 then provides the execution results to retirement unit 360 via retirement interface unit 530.

Routing interface unit 520, in one embodiment, is an interface that generates and receives bus traffic (e.g., instructions/ commands 352 and execution results 354) via interconnect 240. In some embodiments, routing interface unit 520 employs a packet-based communication protocol such as Hyper Transport, PCI Express, Quick Path, etc. In certain embodiments, routing interface unit 520 may store routing information in a routing table 524, which may store source and destination addresses information for multiple coprocessor units 260.

Coprocessor command unit 540, in one embodiment, is configured to generate instructions/commands that are not part of the instruction stream of processor unit 220. For example, coprocessor command unit 540 may generate commands that control the operations of coprocessor unit 260 such as those described above in the context of FIG. 4. In some embodiments, coprocessor command unit 540 may generate commands that control the operations of interconnect 240 and/or companion processor interface 420 (e.g., commands adjusting Hyper Transport communication parameters, etc.). In various embodiments, coprocessor command unit 540 may generate commands in response to an external indication e.g., scheduler unit 310, retirement unit 360, etc. In other embodiments, coprocessor command unit 540 may analyze traffic associated with scheduler interface unit 510 and/or retirement interface unit 530 to determine whether to generate commands.

In various embodiments, coprocessor interface unit 350 includes a register bank 550 to store information related to the various operations of unit 350. For example, coprocessor interface unit 350 may store information associated with threads on processor unit 220 that have a corresponding coprocessor thread. In some embodiments, coprocessor interface unit 350 maintains information associated with various coprocessor units 260, such as the information associated with executing coprocessor threads, completion status information for particular sets of instructions 352, etc.

In various embodiments, coprocessor interface unit 350 maintains information (e.g., in register bank 550 and/or memory 120) pertaining to the various capabilities/functionality of certain coprocessor units 260 (e.g., in a CPUID tree). In some embodiments, coprocessor interface unit 350 may also be configured to throw an exception in the event that any instructions from the instruction stream of processor unit 220 attempt to reference a coprocessor unit 260 in an invalid manner (e.g., referencing a non-existent coprocessor unit 260, referencing unavailable features of a coprocessor unit 260, etc.).

Turning now to FIGS. 6A-6D, a series of block diagrams are presented that illustrate various embodiments of coprocessor unit 260.

Figure 6A:
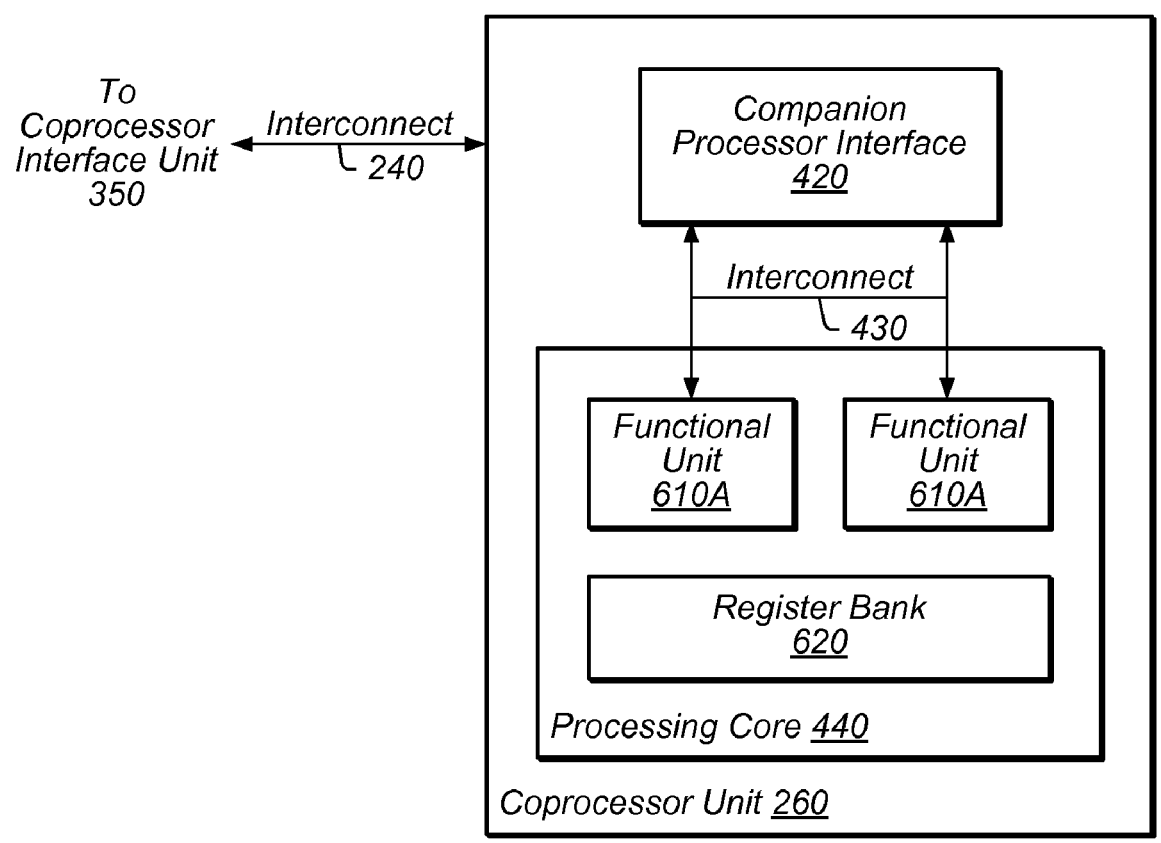
FIGS. 6A-D are block diagrams of various embodiments of coprocessor units.

FIG. 6A illustrates one embodiment of coprocessor unit 260 implementing a multithreaded processing core. As shown, coprocessor unit 260 includes a companion processor interface 420 and processing core 440 coupled via an interconnect 430. In one embodiment, processing core 440 includes a functional unit 610A, functional unit 610B, and register bank 620. In some embodiments, each functional unit 610 is configured to execute instructions 352 for a given thread and generate a corresponding set of executing results 354. In certain embodiments, register bank 620 may store information indicative of particular threads (e.g., thread identifications, process identifications PIDs, context identifications CIDs, etc.). While coprocessor unit 260 is shown with a single processing core 440 with multiple functional units 610, coprocessor unit 260, in other embodiments, includes a plurality of processing cores 440 that include a plurality of functional units 610.

As mentioned above, a thread executing on processor unit 220 may invoke and/or communicate with a particular thread executing on coprocessor unit 260. For example, in one embodiment, only a single coprocessor thread may be paired with a single corresponding processor thread. In another embodiment, multiple coprocessor threads may be paired with a single corresponding processor thread. In some embodiments, a single processor thread may be paired to corresponding coprocessor threads executing on multiple functional units 610 and/or multiple coprocessor units 260.

In various embodiments, coprocessor interface unit 350 provides instructions/commands that control the execution of corresponding coprocessor threads (e.g., via instructions/commands generated by coprocessor command unit 540). For example, these instructions/commands may include directives to suspend a thread that is executing on coprocessor unit 260 or resume the execution of previously executing threads on coprocessor unit 260. In various embodiments, an operating system executing on processor unit 220 initializes new coprocessor threads using instructions 352. In some embodiments, instructions 352 may include commands to execute a context switch in which coprocessor unit 260 suspends an executing thread and switches to another non-executing thread. In such instances, coprocessor unit 260 may execute instructions to save the state of an executing thread and restore the state of a non-executing thread (e.g., using an EXSAVE instruction). In certain embodiments, coprocessor unit 260 transfers the stored state of executing threads from register bank 620 to memory 120. In one embodiment, coprocessor unit 260 may directly access memory 120 to store and retrieve the state information. In another embodiment, coprocessor unit 260 may store and retrieve the state information via processor unit 220. A method for thread switching is described in greater detail in conjunction with FIG. 8 below.

In some embodiments, coprocessor unit 260 may control the execution of corresponding processor threads through execution results 354. In one embodiment, execution results 354 may include completion status information that is used to resume and/or suspend a corresponding processor thread (e.g., a processor thread may block pending completion of a corresponding executing coprocessor thread). In other embodiments, execution results 354 may include explicit commands to resume or suspend a processor thread (e.g., when executing context switch on processor unit 220).

Figure 6B:
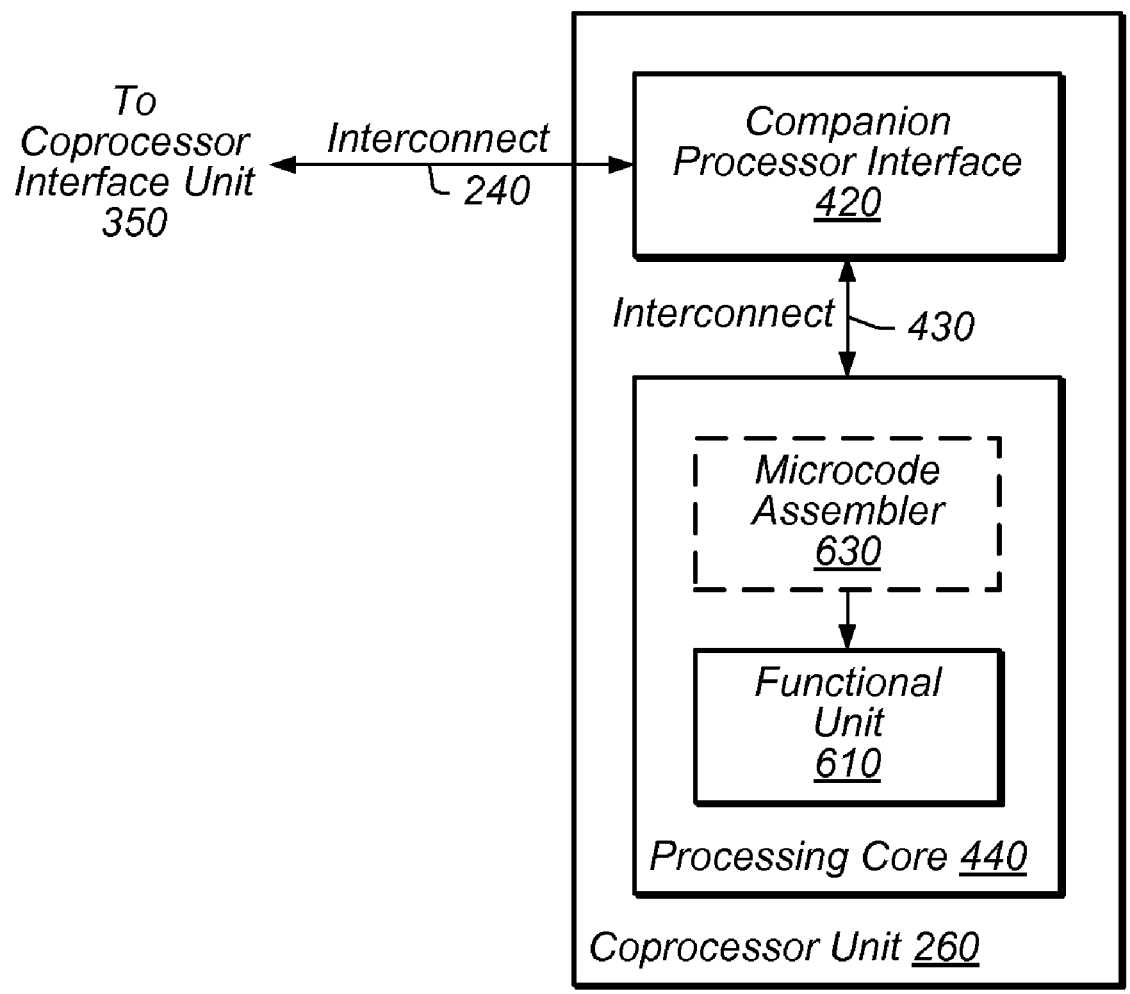

FIG. 6B illustrates one embodiment of a coprocessor unit 260 executing microcode instructions. As shown, coprocessor unit 260 includes a companion processor interface 420 and processing core 440 coupled via interconnect 430. In the embodiment shown, processing core 440 includes a microcode assembler 630 and functional unit 610. In general, microcode assembler 630 is configured to receive a set of instructions (e.g., instructions 352) and generate a corresponding set of microcode instructions that are executable on functional unit 610. Microcode assembler 630 is shown with a dotted to line to indicate that it may (or may not) be included within coprocessor unit 260 in various embodiments. For example, microcode assembler 630 may be located within processor unit 220 (e.g., within coprocessor interface 350), such that instructions 352 include microcode instructions generated from the instruction stream of processor unit 220.

Figure 6C:
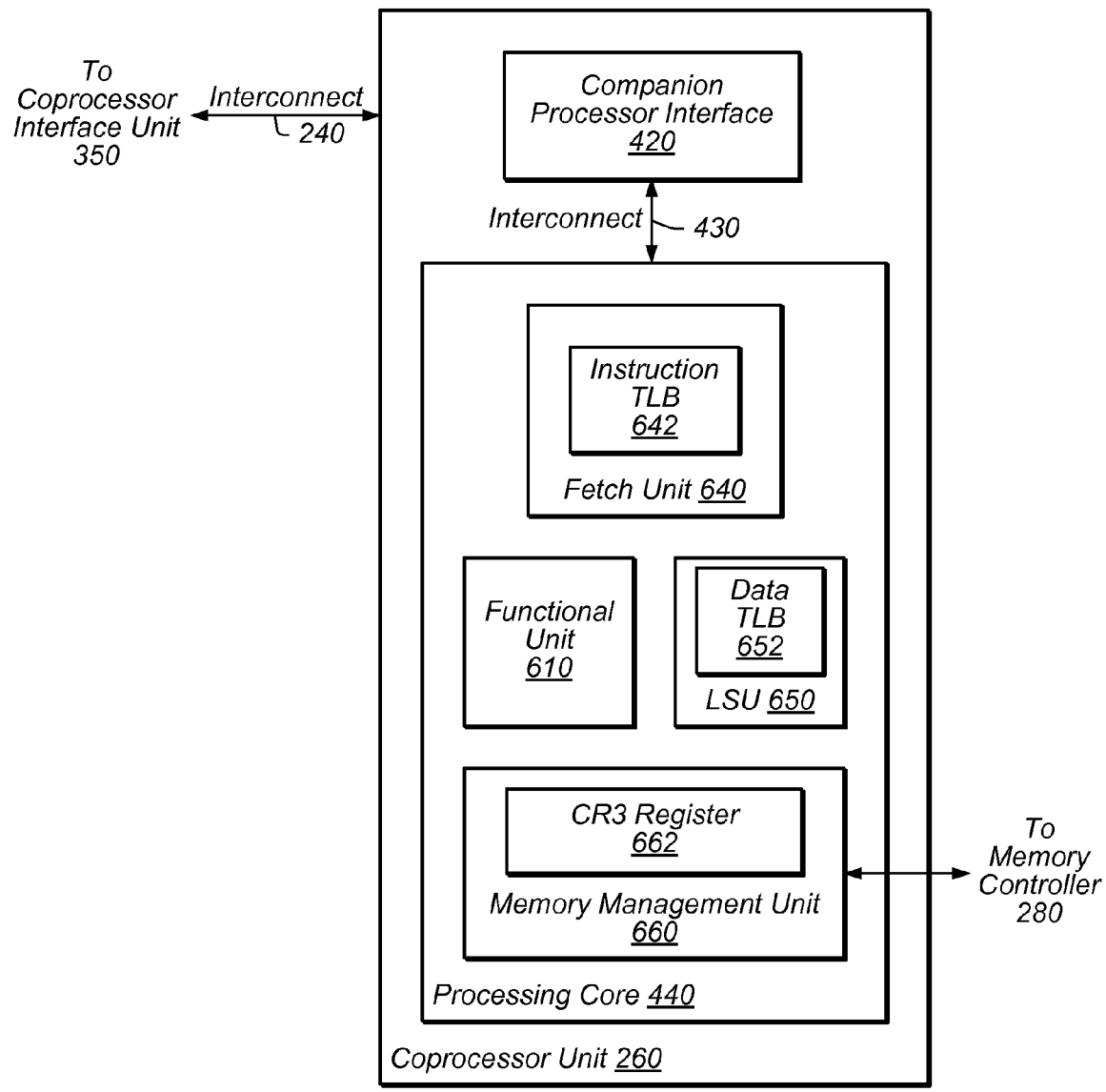

FIG. 6C illustrates one embodiment of a coprocessor unit 260 implementing virtual memory. As shown, coprocessor unit 260 includes a companion processor interface 420 and a processing core 440 coupled via an interconnect 430. In the embodiment shown, processing core 440 includes a fetch unit 640, functional unit 610, load store unit (LSU) 650, and memory management unit (MMU) 660. Additionally, fetch unit 640 and LSU 650 respectively include an instruction translation lookaside buffer (ITLB) 642 and data translation lookaside buffer (DTLB). In various embodiments, other combinations of blocks may (or may not) be implemented e.g., fetch unit 640 and/or LSU 650 may be omitted, a single TLB may be employed as opposing to ITLB 642 and DTLB 652, etc.

In various embodiments, coprocessor unit 260 may be configured to access memory by fetching additional instructions or executing load/store instructions. In one embodiment, fetch unit 640 and LSU 650 retrieve virtual memory translations cached in ITLB 642 and DTLB 652, respectively. In the event that a translation is not found in the appropriate TLB, memory management unit (MMU) 660, in some embodiments, is configured to perform a page table walk for the translation. In certain embodiments, MMU 660 references a CR3 register 662 to obtain the memory address of the current page table prior to performing the page table walk. If the translation is not found in the page table, MMU 660, in some embodiments, throws a page fault exception for an operating system executing on processor 220. A method for accessing memory and performing a page table walk is described in greater detail in conjunction with FIG. 9 below.

As mentioned above, processor unit 220 and coprocessor unit 260, in various embodiments, are configured to maintain a coherent view of memory. As such, instructions 352 and execution results 354 may include commands that manage memory coherence. In one embodiment, instructions 352 may include commands to alter (e.g., update/invalidate) cached data such as translations cached in ITLB 642 and DTLB 652. In other embodiments, instructions 352 may include commands to update CR3 register 662. Similarly, in various embodiments, execution results 354 may include commands to update or invalidate cached data in processor 220 (e.g., within instruction cache 340, data cache 345, any TLBs, etc.).

Figure 6D:
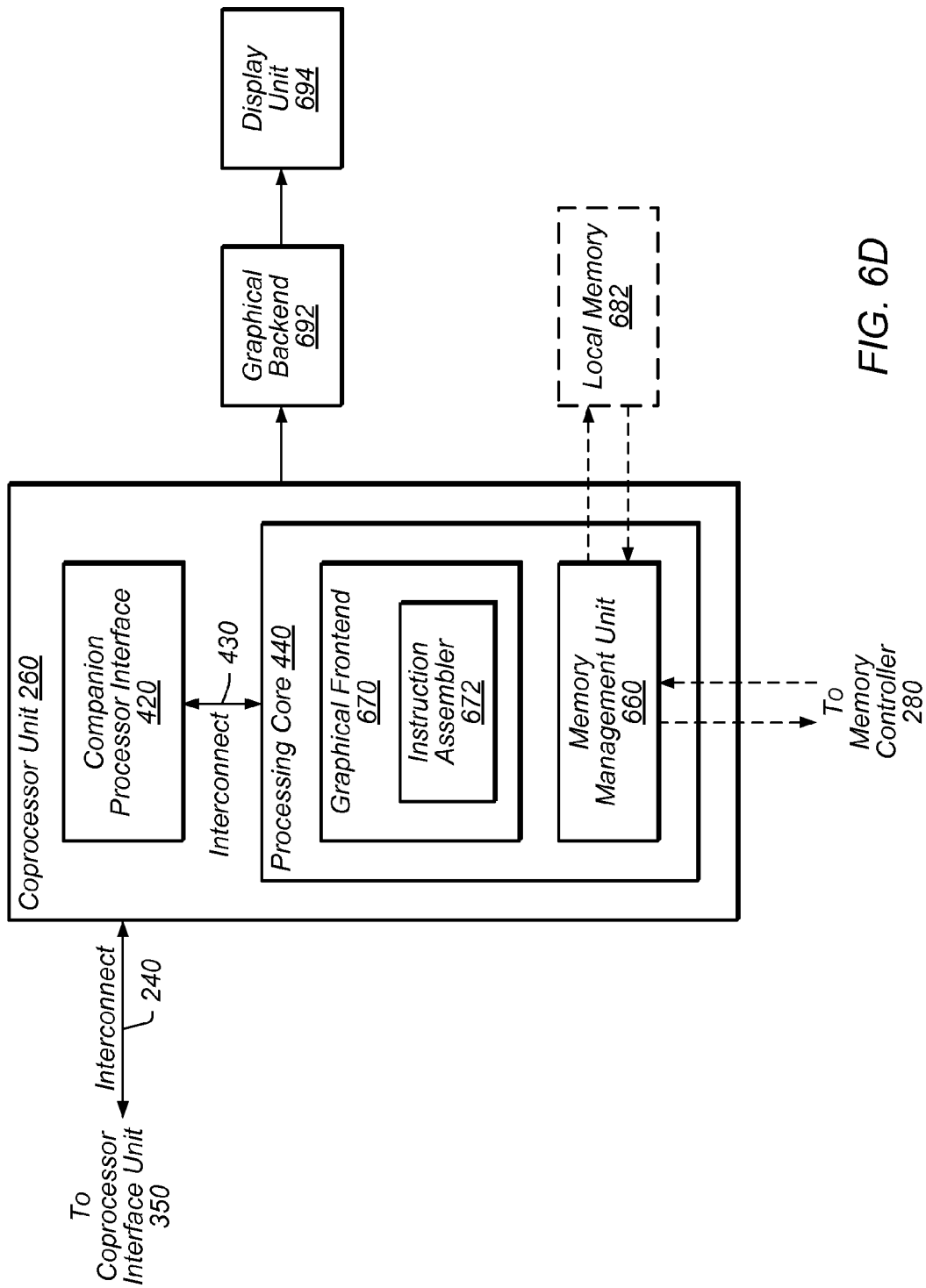

FIG. 6D illustrates one embodiment of a coprocessor unit 260 implementing a graphics engine. As shown, coprocessor unit 260 includes a companion processor interface 420 and a processing core 440 coupled via an interconnect 430. Additionally, processing core 440 includes a graphical frontend 670 and memory management unit (MMU) 660. In the embodiment shown, graphical front-end 670 is coupled to graphical back-end 692 that, in turn, is coupled to a display unit 694. As indicated by the dotted line, MMU 660 may access memory 120 (e.g., via memory controller 280) and/or a local memory 682. While processing core 440 includes graphical front-end 670, processing core 440, in one embodiment, may include graphical back-end 692. Alternatively, graphical backend 692 may be located elsewhere (e.g., in a graphics card or display unit 694).

In various embodiments, coprocessor unit 260 executes specialized graphical instructions from the instruction stream of processor 220. In general, graphical frontend 670 performs various graphical operations that occur prior to image rendering such as polygon generation, lighting effects, or other graphical operations that are known in the art. In some embodiments, graphical frontend 760 may include an instruction assembler 672 that generates graphical instructions for a corresponding graphical backend 692.

Figure 7:
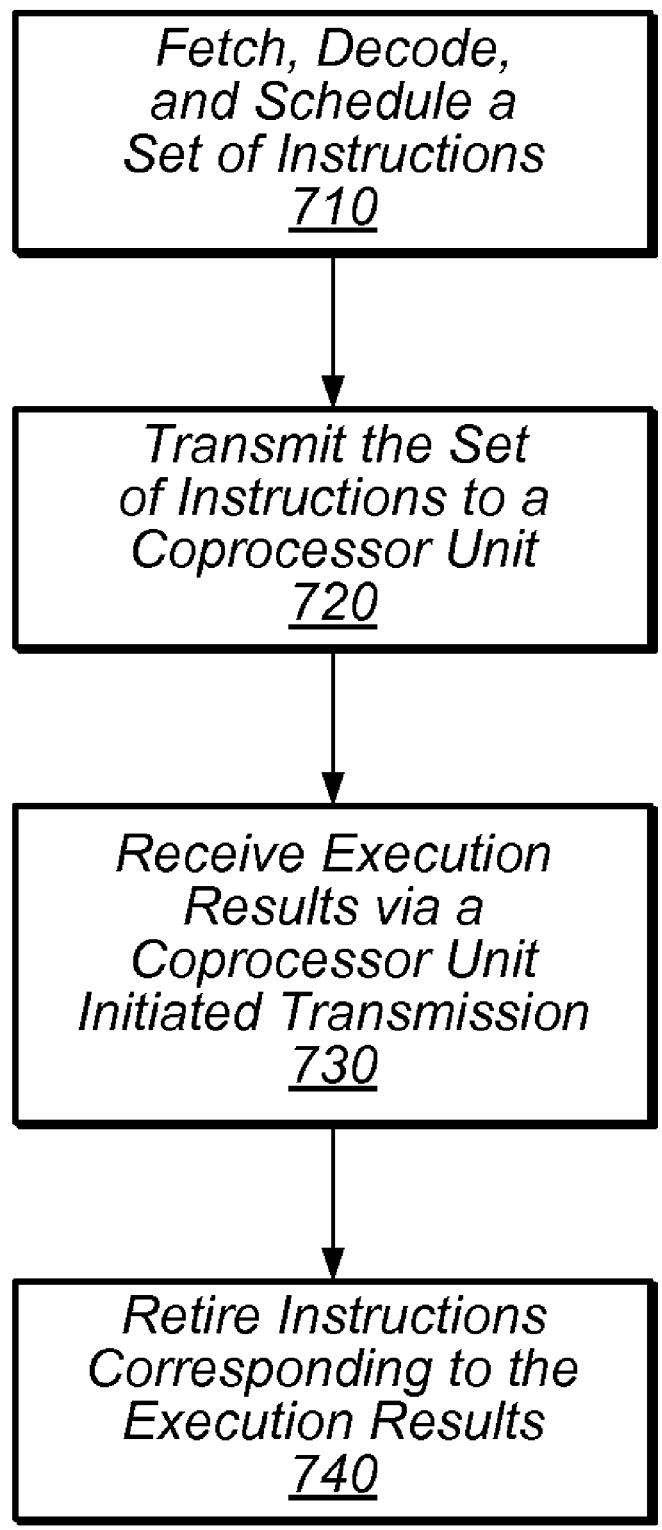
FIG. 7 is a flowchart of one embodiment of a method for executing instructions on a coprocessor via a coprocessor interface.

Turning now to FIG. 7, a flowchart of a method 700 is depicted. Method 700 is one embodiment of a method implemented by processor unit 220 for executing instructions on coprocessor unit 260. Method 700 begins in step 710 with processor unit 220 fetching, decoding, and scheduling a set of instructions. At this time, scheduler unit 310, in various embodiments, decodes the instructions and routes them to their respective functional units (e.g., units 320, 330, and 350). In one embodiment, scheduler unit 310 routes instructions to coprocessor interface unit 350 when the instructions contain specific opcodes that are associated with coprocessor instructions. In alternative embodiments, instructions may be routed based on other criteria such as a particular range of memory addresses, PIDs, etc. In step 720, coprocessor interface unit 350 transmits the set of instructions 352 to a coprocessor unit 260 (e.g., using Hyper Transport or PCI-Express protocols through a Northbridge-type device that is coupled to the coprocessor unit 260). There, coprocessor unit 260 executes instructions 352 to generate a corresponding set of execution results 354. In step 730, coprocessor interface unit 350 receives the execution results 354 via a coprocessor unit-initiated transmission, and, in step 750, retires the corresponding instructions e.g., via retirement unit 360. In various embodiments, retirement unit 360 may store resultant values of the execution results 354 and handle any thrown exceptions.

Figure 8:
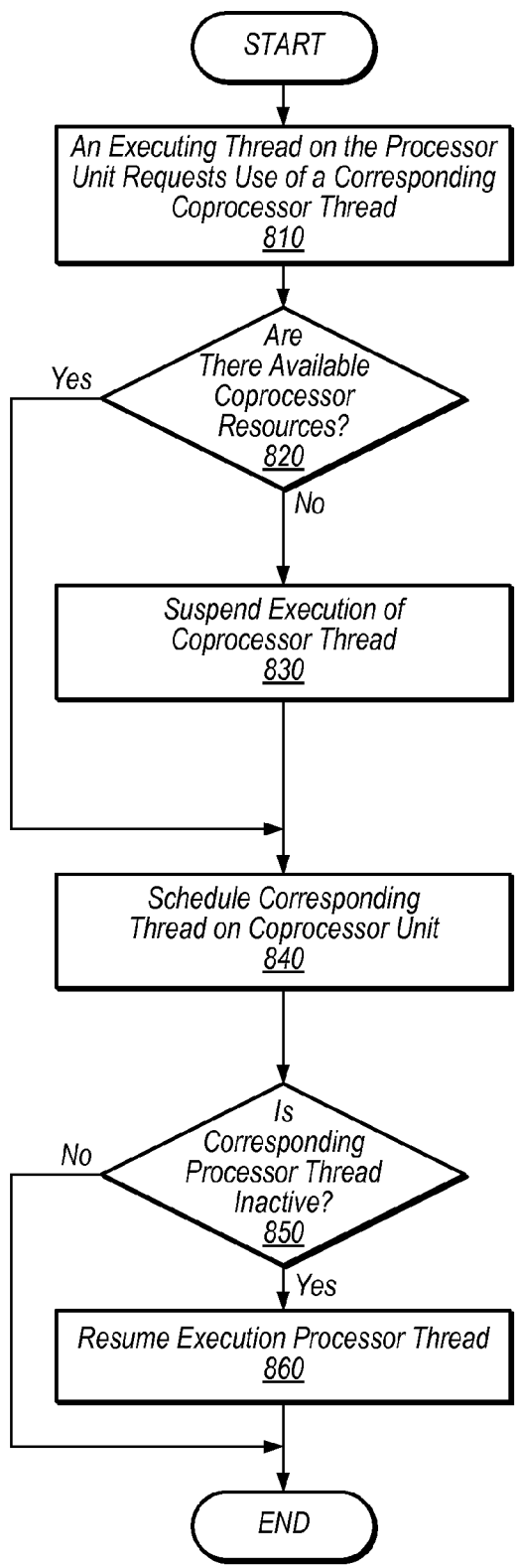
FIG. 8 is a flowchart of one embodiment of a method for switching threads on a coprocessor unit.

Turning now to FIG. 8, a flowchart of a method 800 is depicted. Method 800 is one embodiment of a method for switching threads on a coprocessor unit 260. For example, steps 810-840 may be performed when a processor thread executing on processor unit 220 initializes a new thread or resumes execution of an existing thread on coprocessor unit 260. In the event that the processor thread suspends pending completion of the new/existing thread, steps 850-860 may be performed to resume the processor thread. It is noted that method 800 may be implemented in variety of manners in different embodiments (e.g., method 800 may not include performing steps 850-860, may include additional steps not shown, etc.).

Method 800 begins in step 810, where an executing thread on the processor unit 220 requires use of a corresponding coprocessor thread. In one embodiment, the executing processor thread indicates this requirement by throwing an exception for an operating system to schedule a new or existing thread.

In step 820, processor unit 220 determines whether available coprocessor resources exist. In one embodiment, processor unit 220 determines this availability by accessing information in coprocessor interface unit 350 (e.g., in register bank 550). In another embodiment, processor unit 220 queries coprocessor unit 260 via a coprocessor command. If coprocessor resources are available, then method 800 proceeds to step 840. Otherwise, method 800 proceeds to step 830.

In step 830, processor unit 220 instructs coprocessor unit 260 to suspend an executing coprocessor thread. In various embodiments, coprocessor unit 260 may store state information of the thread being suspended—e.g., by directly storing the state in memory 120 or transmitting the state to processor unit 220 for storage.

In step 840, an operating system of processor unit 220 schedules the requested thread for execution on coprocessor unit 260. If the requested thread was previously executing, coprocessor unit 260 may load any previous state information associated with the thread.

Once execution of the requested coprocessor thread completes, coprocessor unit 260 may generate an execution result 354 indicating this completion. In the event that the processor thread has blocked, in step 850 (i.e., the processor thread has blocked pending completion of the coprocessor thread), processor unit 220, in step 860, resumes execution of the processor thread. It is noted that, in some embodiments, coprocessor unit 260 may directly instruct the operating system to resume the processor thread (e.g., by throwing an exception upon completing execution of the corresponding coprocessor thread).

Figure 9:
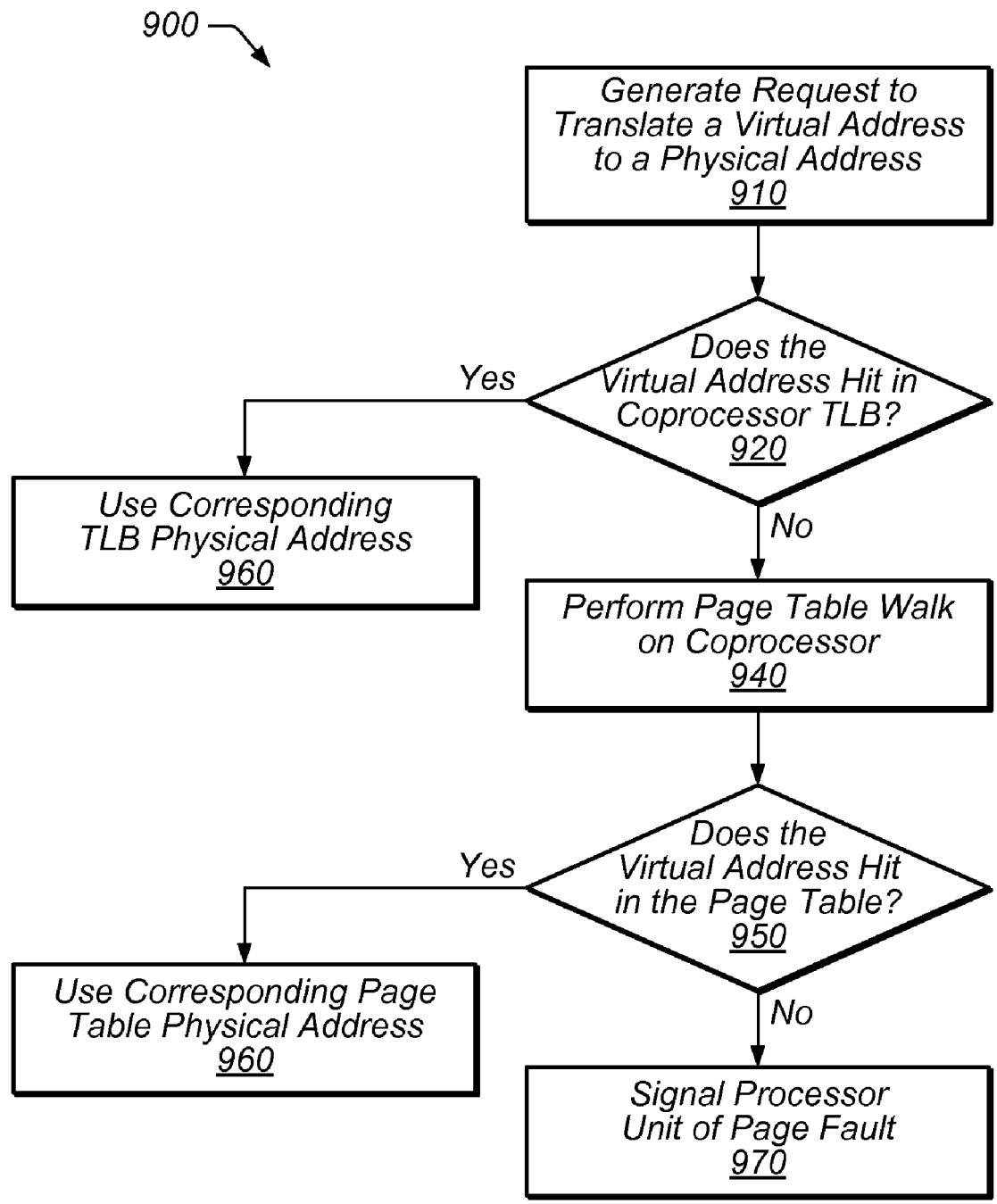
FIG. 9 is a flowchart of one embodiment of a method implemented by a coprocessor unit employing a virtual address space.

Turning now to FIG. 9, a flowchart of a method 900 is depicted. Method 900 is one embodiment of a method implemented by a coprocessor unit 260 employing a virtual address space.

Method 900 begins in step 910, where coprocessor unit 260 generates a request to translate a virtual address to a physical address 910. For example, coprocessor unit 260 may perform a virtual memory translation when fetching instructions or accessing memory.

In step 920, coprocessor unit 260 determines whether the virtual address hits (i.e., is present) in a coprocessor TLB (e.g., ITLB 642 or DTLB 652). If a virtual address hits in the TLB, the translation is used to determine a corresponding physical address in step 930. However, if the virtual address misses in the TLB, method 900 proceeds to step 940.

In step 940, coprocessor unit 260 performs a page table walk (e.g., using MMU 660) to search for a corresponding translation. If, in step 950, the virtual address hits in the page table, coprocessor unit 260 may load the translation in the TLB and determine a corresponding physical address in step 960. On the other hand, if, in step 950, the virtual address misses in the page table, method 900 proceeds to step 970.

In step 970, coprocessor unit 260 signals processor unit 220 of a page fault. In one embodiment, coprocessor unit 260 generates execution results 354 that include a page fault exception that is serviceable by an operating system executing on processor unit 220. In some embodiments, coprocessor interface unit 350 may notify coprocessor unit 260 when the operating system has serviced the page fault (e.g., via a command generated by coprocessor command unit 540).

Figure 10:
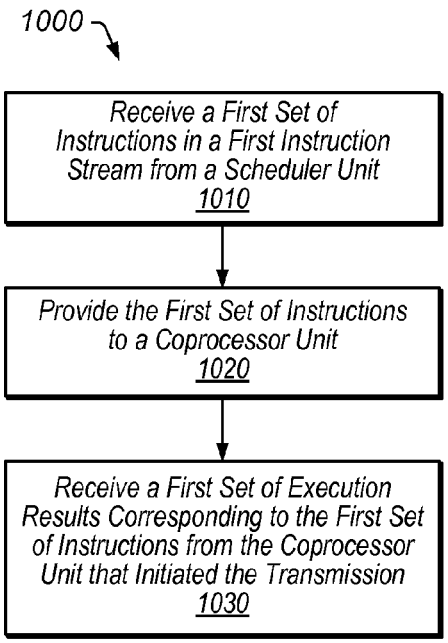
FIG. 10 is a flowchart of one embodiment of a method implemented by a first processor functional unit.

Turning now to FIG. 10, a flowchart of a method 1000 is depicted. Method 1000 is one embodiment of a method implemented by a first processor functional unit (e.g., coprocessor interface unit 350). In step 1010, the first processor functional unit receives a first set of instructions (e.g., instructions 352) in a first instruction stream from a scheduler unit 310. In step 1020, the first processor functional unit provides the first set of instructions to a coprocessor unit (e.g., unit 260). Then, the coprocessor unit 260 may execute the instructions 352, generating a corresponding set of execution results 354. In step 1030, the first processor functional unit receives a first set of execution results (e.g., execution results 354) corresponding to the first set of instructions from the coprocessor unit 260, where the coprocessor unit 260 initiated the transmission.

Figure 11:
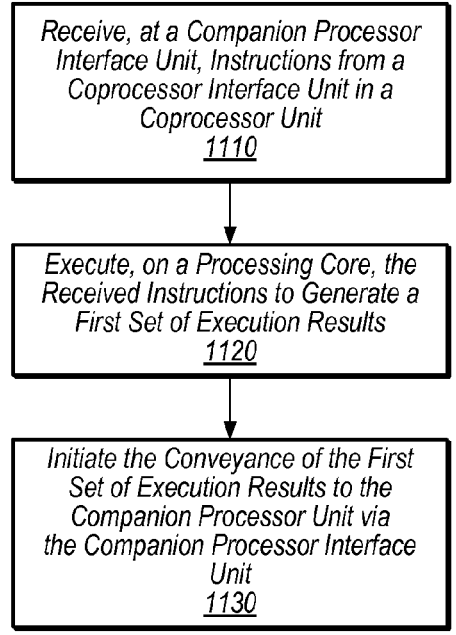
FIG. 11 is a flowchart of one embodiment of a method implemented by a coprocessor unit.

Turning now to FIG. 11, a flowchart of a method 1100 is depicted. Method 1100 is one embodiment of a method implemented by a coprocessor unit 260. In step 1110, coprocessor unit 260 receives, at a companion processor interface unit (e.g., companion processor interface 420), instructions 352 from a coprocessor interface unit (e.g., coprocessor interface unit 350) in a companion processor unit (e.g., processor unit 220). In step 1120, coprocessor unit 260 executes, on a processing core 440, the received instructions 352 to generate a first set of execution results 354. In step 1130, coprocessor unit 260 initiates the conveyance of the first set of execution results 354 to the companion processor unit (e.g., processor unit 220) via the companion processor interface unit (e.g., companion processor interface 420).

Figure 12:
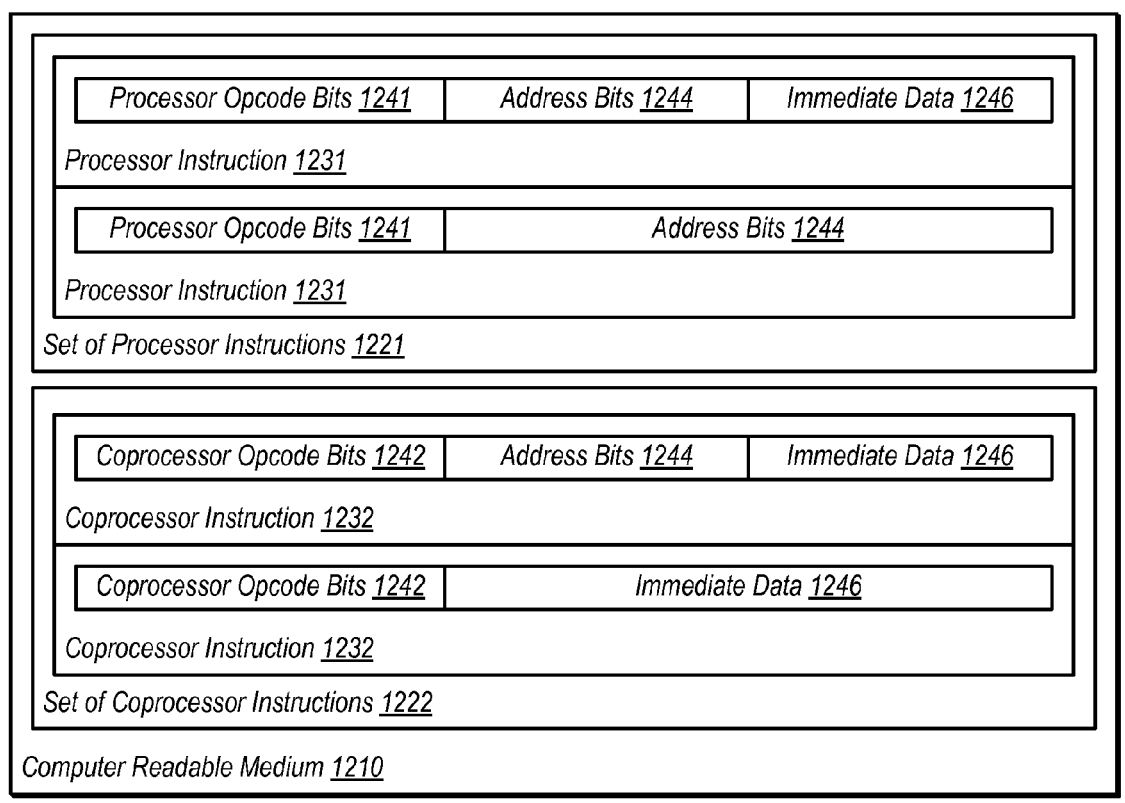
FIG. 12 is a block diagram of one embodiment of a computer readable medium.

Turning now to FIG. 12, a computer readable medium 1210 is depicted. Computer readable medium 1210 is one embodiment of an article of manufacture that stores instructions that are executable by a computer system 100 that includes processor unit 220 and coprocessor unit 260. As shown, computer readable medium 1210 includes a set of processor instructions 1221 executable by one or more functional units within processor unit 220 and a set of coprocessor instructions 1222 that are executed by coprocessor unit 260. In the illustrated embodiment, each processor instruction 1231 in set 1221 includes processor opcode bits 1241, and each of the coprocessor instructions 1232 in set 1222 includes coprocessor opcode bits 1242. In various embodiments, instructions 1231 and 1232 may include address bits 1244 and/or immediate data 1246. (Other arrangements of instructions 1231 and 1232 than those shown are of course possible. For example, all instructions need not include immediate data or address bits.)

Scheduler unit 310 may schedule/route instructions using various criteria. In one embodiment, scheduler 310 routes instructions based on opcode bits (e.g., processor instructions 1231 include processor opcode bits 1241 and coprocessor instructions 1232 include coprocessor opcode bits 1242). In another embodiment, scheduler 310 routes instructions based on address bits 1244 (e.g., certain addresses are associated with processor instructions while others are associated with coprocessor instructions). In other embodiments, scheduler 310 schedule instructions for execution based on other criteria such as the ordering of instructions within a program 1220, etc.

Computer readable medium 1210 may include any of a variety of mediums that store program instructions and/or data used during execution. In one embodiment, computer readable medium 1210 is an article of manufacture such as a tangible computer-readable memory medium that may include various portions of the memory subsystem of computer system 100. In other embodiments, tangible computer readable medium 1210 may include storage media or memory media such as magnetic (e.g., disk) or optical media (e.g., CD, DVD, and related technologies, etc.). Tangible computer readable medium 1210 may be either volatile or nonvolatile memory. For example, tangible computer readable medium 1210 may be (without limitation) SDRAM, DDR SDRAM, RDRAM, SRAM, flash memory, and of various types of ROM, etc. FIG. 1, for example, includes a tangible computer-readable media (e.g. memory 120), which is respectively usable to store program instructions that are executable processor unit 220 or coprocessor unit 260.

In other embodiments, computer readable medium 1210 is a non-tangible medium that may store/encode instructions and/or data on signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description. For example, instructions executable on computer system 100 may be transmitted over various types of computer networks.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of processor functional units including a first processor functional unit configured to receive, from a scheduler unit, a first set of instructions in a first instruction stream, provide the first set of instructions to a coprocessor unit, and receive, from the coprocessor unit, a first set of execution results corresponding to the first set of instructions, wherein transmission of the first set of execution results is initiated by the coprocessor unit; and
   a retirement unit configured to retire instructions performed by the plurality of processor functional units;
   wherein the first processor functional unit includes a retirement unit interface configured to provide the first set of execution results to the retirement unit to cause retirement of the first set of instructions.

2. The apparatus of claim 1, further comprising:
the scheduler unit;
wherein the plurality of processor functional units includes a load store unit;
wherein the scheduler unit is configured to fetch a second set of instructions from the first instruction stream, and to select one of the plurality of processor functional units to perform the second set of instructions;
wherein the first processor functional unit includes a scheduler unit interface configured to receive the first set of instructions from the scheduler unit, wherein the first processor functional unit is a processor functional unit that is dedicated to communicating with the coprocessor unit, and wherein the retirement unit interface is configured to provide the first set of execution results directly to the retirement unit.

3. The apparatus of claim 1, wherein the first processor functional unit is configured to save, at the coprocessor unit, an execution state of a thread executing on the coprocessor unit.

4. The apparatus of claim 1, wherein the first processor functional unit includes a register bank configured to store information associated with one or more threads executing on the apparatus that have a corresponding thread executing on the coprocessor unit.

5. The apparatus of claim 1, wherein the first processor functional unit includes a routing interface unit configured to provide the first set of instructions via a shared bus circuit coupling the first processor functional unit to the coprocessor unit, wherein the bus circuit is configured to implement a packet-based protocol.

6. The apparatus of claim 5, wherein the packet-based protocol is one of the following: a hyper-transport protocol, a PCI-Express protocol.

7. The apparatus of claim 1, further comprising:
a plurality of coprocessor units that includes the coprocessor unit;
wherein the first processor functional unit is configured to provide sets of instructions to various ones of the plurality of coprocessor units, and receive, from various ones of the plurality of coprocessor units, corresponding sets of execution results;
wherein the first processor functional unit is further configured to maintain routing information and to route the sets of instructions to the various ones of the coprocessor units based on the routing information.

8. The apparatus of claim 1, wherein the first processor functional unit is configured to alter entries in a translation lookaside buffer (TLB) located in the coprocessor unit.

9. The apparatus of claim 1, wherein the first processor functional unit is further configured to:
receive an indication of a page fault from the coprocessor unit;
notify an operating system of the apparatus of the page fault; and
indicate to the coprocessor unit that the operating system has serviced the page fault.

10. The apparatus of claim 1, wherein the first processor functional unit includes a register bank configured to store information specifying whether the first set of instructions have been completed.

11. The apparatus of claim 1, wherein the first processor functional unit is configured to resume and suspend a thread executing on the coprocessor unit.

12. The apparatus of claim 1, wherein the apparatus is a computer system comprising:
a processor unit including the first processor functional unit and the retirement unit.

13. A coprocessor unit, comprising:
a companion processor interface unit configured to receive instructions from a coprocessor interface unit in a companion processor unit, wherein the instructions are from an instruction stream shared by the companion processor unit; and
a processing core configured to execute the received instructions, to generate a first set of execution results, and to initiate the conveyance of the first set of execution results to the companion processor unit via the companion processor interface unit;
wherein the coprocessor interface unit includes a retirement unit interface configured to provide the conveyed first set of execution results directly to a retirement unit of the companion processor unit to cause retirement of the received instructions, and wherein the retirement unit is configured to retire instructions performed by a plurality of processor functional units in the companion processor unit.

14. The coprocessor unit of claim 13, wherein the processing core includes a translation lookaside buffer (TLB), and wherein the processing core is configured to:
transmit, via the companion processor interface unit, an indication of a page fault to an operating system that is executing on the companion processor; and
receive, via the companion processor interface unit, an indication that the operating system has serviced the page fault.

15. The coprocessor unit of claim 13, wherein the coprocessor unit includes a cache, and wherein the companion processor is further configured to alter entries in the cache of the coprocessor unit.

16. The coprocessor unit of claim 13, wherein the processing core is configured to perform a page table walk.

17. The coprocessor unit of claim 13, wherein the coprocessor unit is configured to suspend and resume a thread executing on the companion processor unit.

18. The coprocessor unit of claim 13, wherein the coprocessor unit is configured to generate microcode instructions to implement the received instructions.

19. An apparatus, comprising:
a scheduler unit;
a plurality of processor functional units including a first processor functional unit configured to receive, from the scheduler unit, a first set of instructions in an instruction stream, provide the first set of instructions to a coprocessor unit, and receive, from the coprocessor unit, a first set of execution results corresponding to the first set of instructions, wherein transmission of the first set of execution results is initiated by the coprocessor unit; and
a retirement unit configured to retire instructions performed by the plurality of processor functional units;
wherein the first processor functional unit includes a retirement unit interface configured to provide the first set of execution results directly to the retirement unit to cause retirement of the first set of instructions, and wherein the first processor functional unit is a processor functional unit that is dedicated to communicating with the coprocessor unit.

20. The apparatus of claim 19, wherein the plurality of processor functional units includes a load store unit.

* * * * *